2,971,015
SURFACE-ACTIVE AGENTS FROM POLYMERIC SUBSTANCES

Manfred Dohr, Dusseldorf-Wersten, and Horst-Jurgen Krause and Carl Wulff, Dusseldorf-Benrath, Germany, assignors to Henkel & Cie., Dusseldorf, Germany No Drawing. Filed Jan. 31, 1957, Ser. No. 637,371

Claims priority, application Germany Feb. 3, 1956

9 Claims. (Cl. 260—404.5)

This invention relates to and has as its object the production of novel surface-active agents, which are useful as detergents and textile-treating materials.

The novel, surface-active agents in accordance with the invention are addition products of polyglycol ethers with bis-isocyanate N,N dicarbamic acid esters of dialkylolamides.

The polyglycol ethers, which are used, have the formula $HO(CH_2-CH_2O)_nH$ in which $n$ is greater than 3 and may be obtained by polymerisation of ethylene oxide. Also there may be used as polyglycol ethers addition products of ethylene oxide and bifunctional compounds such as diols, dimercaptans, secondary diamines as well as monoglycerides. The polyglycol ethers, as above described should have a molecular weight between about 200 and 4000 and preferably between about 400 and 1600.

The bis-isocyanate N,N dicarbamic acid esters of the dialkylolamides have the formula

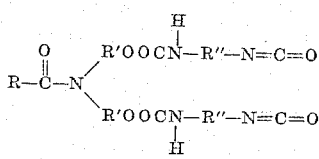

in which R is an aromatic, heterocyclic or aliphtic hydrocarbon radical, which may contain heteroatoms, such as nitrogen, oxygen, or sulfur, R' is an aliphatic hydrocarbon radical, which may be interrupted by heteroatoms, such as nitrogen, oxygen, or sulfur, and R" is a hydrocarbon radical, such as an aliphatic, aromatic, or heterocyclic radical.

These esters are formed by adding a diisocyanate to a dialkylolamide in the molar ratio of 2:1. The so obtained ester must have in every case two reactive groups which can react with the polyglycol ether.

As dialkylolamides, there may be used any amides which contain 2 alkylol radicals but no other groups which will react with an isocyanate group. There are preferably used dialkylolamides which contain at least 10 carbon atoms in their molecule, so that a sufficiently large hydrophobic (non-polar) radical is present in the final product. Monocarboxylic acid dialkylolamides, which are readily available, are particularly well suited for the production of the novel surface-active agents in accordance with the invention. In this connection, there may be used dialkylolamides of aliphatic, aromatic, or heterocyclic carboxylic acids in connection with which any of the aliphatic chains present may be interrupted by heteroatoms, such as nitrogen, oxygen, or sulfur. Furthermore, branchings or double bonds may also be present in the chain. There are preferably used diethanol and diisopropanol amides of fatty acids, as, for example, diethanol amides or diisopropanol amides of lauric, myristic, palmitic, stearic, arachidic, and behenic acid. Also there may be preferably used dialkylolamides of n-lauroyl-ε-amino-caproic acid and abietic acid, as n-lauroyl-ε-aminocaproic acid diisopropanolamide and abietic acid diethanolamide.

The diisocyanates used for the production of the esters may be aliphatic, aromatic, or heterocyclic diisocyanates, as, for example, 1.6-hexamethylene-diisocyanate, tolylene diisocyanate, 1,5-naphthylene diisocyanate, 1,4-phenylene diisocyanate, methyl phenylene diisocyanate, 4,4'-diphenyl-diisocyanate, 4,4'-diphenylmethane-diisocyanate, or any of the other known diisocyanates, as, for example, are mentioned in Liebigs Annalen, volume 562, pages 122–134. The reaction between the amide and the diisocyanate may be effected at temperatures between about 15 and 150° C., and preferably in the presence of suitable solvents, as, for example, benzene, toluene, dioxan, chlorobenzene, carbon tetrachloride, etc., though such solvents are not absolutely necessary. It is preferable to add the amide, as, for example, dissolved in an inert solvent drop by drop to the diisocyanate, which preferably is also dissolved in an inert solvent. The amounts of solvent may be 2–30 parts by weight of solvent to one part by weight of the bis-isocyanate of the N,N dicarbamic acid esters of the dialkylolamide, which is used. The addition of the amide to the diisocyanate is carried out without heating at room temperature. By heating to the boiling point of the solvent or by boiling for a short period of time under reflux, the addition is carried to completion. It is advisable to operate in an inert atmosphere so that no side reactions are caused by the presence of oxygen. The reaction may be accelerated by the addition of a small amount of catalyst such as a tertiary nitrogen base preferably in an amount of 0.1 to 3% by weight of the diisocyanate present.

The polyglycol ether is then added to the ester, to form the surface-active agent in accordance with the invention. Suitable polyglycol ethers as above described include compounds obtained by the polymerization of ethylene oxide or addition products of ethylene oxide and bifunctional compounds having reactive hydrogen, such as diols, dimercaptans, secondary diamines, as well as monoglycerides. The polyglycol ethers should have a molecular weight between about 200 and 4000, and preferably between about 400 and 1600.

The molecular weight of the surface active agent, in accordance with the invention may be regulated to a large extent, by the molar ratio of the components employed. The closer the mol ratio of the two components, the polyglycol ether and the bis-isocyanate of the N,N dicarbamic acid ester of the dialkylolamide is to the value 1:1, the greater the possibility for the formation of high molecular products. In practice it is however not always necessary to use this value and in most cases it is sufficient that the molar ratio of the said two components be between the values of 10:5 and 5:10. Preferably the polyglycol ether is added to the said ester in equimolecular quantities.

The addition of the polyglycol ethers to the esters may be effected at temperatures between 50° and 150° C., and preferably in the presence of suitable solvents, which may be, for example, the same solvents used in connection with the reaction between the amides and diisocyantes, for example, benzene, toluene, dioxan, chlorobenzene, and carbon tetrachloride.

The polyglycol ether may be added directly to the reaction mixture obtained in the reaction between the diisocyanate and the amide. For this purpose the polyglycol ether may be dissolved in the same solvent. The mixture can then be further heated, as, for example, under reflux. Heating for prolonged periods of time, however, should be avoided, because it may lead to crosslinking and thus to water-insoluble products. Since water-insoluble products are not desired, the reaction is preferably interrupted before this cross-linking occurs, which may easily be determined by sampling. After the heating, the solvent is distilled off, preferably under vacuum, and upon cooling there are obtained water-soluble, surface-active, foaming products of a resinous to wax-like consistency.

These new surface-active agents are excellently suited as textile-treating materials, as addition to detergents, and for all purposes where surface-active substances are conventionally used. The new compounds are particularly well suited as dispersing agents and as addition material to other emulsifiers.

The following examples are given by way of illustration and not limitation:

*Example 1*

Hexamethylene diisocyanate is mixed with five times its quantity of anhydrous dioxan and ½ mol palmitic acid diethanolamide, also dissolved in five times its quantity of anhydrous dioxan is slowly added thereto for each mol of hexamethylene diisocyanate under stirring while a nitrogen atmosphere is maintained. Thereupon the mixture is heated for 60 minutes under reflux. The reaction mixture is allowed to cool off somewhat, whereupon 1 mol of polyglycol ether of a molecular weight of 4,000 is slowly added for each mol of addition product.

The mixture is thereupon heated for two additional hours under reflux. A sample shows good water-solubility. The solvent is now distilled off in vacuum, and after cooling, there is obtained, as residue, a solid, water-soluble, high-molecular product of a wax-like consistency having good surface-active properties.

*Example 2*

111.6 parts by weight hexamethylene diisocyanate are dissolved in 100 cc. of anhydrous dioxan and 114 parts by weight of palmitic acid diethanolamide dissolved in 600 cc. of anhydrous dioxan are slowly added while stirring. The mixture is heated for about 1 hour under reflux with stirring and thereupon 514.4 parts by weight of a polyethylene glycol of a molecular weight of about 1550 are added. Thereupon, heating under reflux is continued until a sample of the high-molecular reaction product exhibits good solubility in water. Thereupon the solvent is distilled off in vacuum. The residue is a water-solube product of a wax-like consistency.

An aqueous solution which contains 0.1 gram per liter of this product dissolved has (at 20° C. and 0° German hardness) a surface tension of 49.8 dyn./cm., which, when using 1 gram per liter, drops further to 44.2 dyn./cm.

*Example 3*

The procedure is essentially the same as described in Example 1, but 33.7 parts by weight of hexamethylene diisocyanate are added to 37.2 parts by weight of stearic acid diethanol amide with the use of dioxan as solvent. The product obtained is further reacted by heating with 100.1 parts by weight of a polyethylene glycol ether having a molecular weight of about 1000. A water-soluble high-molecular surface-active compound of very soft consistency is obtained.

An 0.1% aqueous solution thereof has a surface tension of 39.3 dyn./cm. at 20° C. and 0° German hardness.

*Example 4*

To a solution of 104.4 grams tolylene diisocyanate and 100 cc. anhydrous carbon tetrachloride, there are slowly added, while stirring, 111.6 parts by weight of stearic acid diethanolamide, previously dissolved in 500 cc. anhydrous carbon tetrachloride and thereupon the mixture is heated for 50 minutes up to the boiling point. During this time, one operates in a stream of nitrogen.

Thereupon 600 grams of a polyethylene glycol ether having a molecular weight of about 600 are added while stirring, and the reaction mixture is again heated about 120 minutes up to boiling point. After the solvent has been distilled off, a high-molecular product having good surface-active properties is obtained.

*Example 5*

21 parts by weight (0.1 mol) 1,5-naphthylene diisocyanate are dissolved in 60 cc. of toluene and 21.4 parts by weight (0.05 mol) n-lauroyl-ε-aminocaproic acid diisopropanolamide dissolved in 300 cc. of toluene are slowly added under stirring in a nitrogen stream. Then the mixture is heated for 30 minutes under reflux. Thereafter 22 parts by weight (0.055 mol) polyethylene glycol ether having a molecular weight about 400 is added and the mixture is heated for one additional hour under reflux.

Thereupon the solvent is distilled off in vacuum. The residue, is a water-soluble high-molecular weight product having good surface-active properties.

*Example 6*

To a solution of 23.6 parts by weight (0.1 mol) 4,4' diphenyl-diisocyanate and 100 cc. anhydrous dioxan, 19.5 parts by weight (0.05 mol) abietic acid diethanolamide, previously dissolved in 300 cc. anhydrous dioxan are slowly added and thereupon the mixture is heated for 35 minutes under reflux. Thereafter 30 grams of polyethylene glycol ether having a molecular weight of about 600 are added while stirring, and the reaction mixture is again heated about two hours under reflux. After the solvent has been distilled off, a high-molecular product having good surface-active properties is obtained.

*Example 7*

An excellent washing agent is obtained by preparing a 1% aqueous solution of a mixture of the following composition:

25% by weight of the surface-active agent, in accordance with the invention, prepared as described in Example 3
30% by weight of sodium tripolyphosphate
15% by weight of sodium pyrophosphate
15% by weight of sodiumsulfate
6% by weight of waterglas
0.2% by weight of cellulose glycolate
0.1% by weight of optical brightener
Balance is water The above described washing agent has good cleansing and washing properties, does not foam and is excellently suited for use in washing machines.

We claim:

1. A surface-active agent consisting of the addition product of a polyglycol ether having a molecular weight between about 200 and 4000 and a bis-isocyanate N,N-dicarbamic acid ester of a dialkylol amide having the formula:

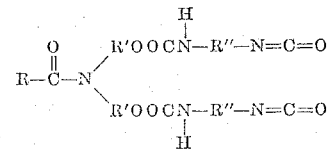

wherein R is a fatty acid radical containing at least 10 carbon atoms, R' is a lower alkylene radical and R" is selected from the group consisting of hexamethylene, naphthylene, tolylene, phenylene, methyl phenylene, diphenyl and diphenyl methane radicals.

2. A surface-active agent according to claim 1 wherein the glycol ether has a molecular weight between about 400 and 1600.

3. Process for the preparation of surface-active agents, which comprises contacting a dialkylolamide having the formula:

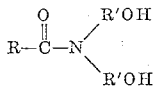

wherein R is a fatty acid radical containing at least 10 carbon atoms and R' is a lower alkylene radical, with a di-isocyanate having the formula $$O=C=N-R''-N=C=O$$

wherein R'' is selected from the group consisting of hexamethylene, naphthylene, tolylene, phenylene, methyl phenylene, diphenyl and diphenyl methane radicals, in the molar ratio of 1:2 at a temperature between about 15 to 150° C., and thereafter heating the reaction product obtained with a polyglycol ether having a molecular weight between about 200 and 4000 and recovering the surface-active agent formed.

4. A surface-active agent, consisting of the addition product of a polyglycol ether having a molecular weight between about 200 and 4000 and a bis-hexamethylene isocyanate N,N di-carbamic acid ester of a dialkylol-amide selected from the group consisting of palmitic acid, diethanol amide, and stearic acid diethanol amide.

5. A surface-reactive agent according to claim 4, in which said polyglycol ether has a molecular weight between about 400 and 1600.

6. Process according to claim 3, in which said contacting is effected in the presence of an inert solvent.

7. Process according to claim 3, in which said contacting is effected in an inert atmosphere.

8. Process according to claim 3, in which said polyglycol ether has a molecular weight between about 400 and 1600.

9. Process according to claim 8 in which said contacting is effected in the presence of a solvent at a temperature between about 50 and 150° C., and said heating is effected in the presence of said solvent.

References Cited in the file of this patent
UNITED STATES PATENTS

| | | |
|---|---|---|
| 2,478,859 | Carnes et al. | Aug. 9, 1949 |
| 2,738,333 | Goldsmith | Mar. 13, 1956 |
| 2,764,601 | Garceau | Sept. 25, 1956 |
| 2,765,324 | Niederhauser | Oct. 2, 1956 |

UNITED STATES PATENT OFFICE
CERTIFICATION OF CORRECTION

Patent No. 2,971,015                                 February 7, 1961

Manfred Dohr et al.

It is hereby certified that error appears in the above numbered patent requiring correction and that the said Letters Patent should read as corrected below.

Column 1, line 41, for "aliphtic" read -- aliphatic --; column 5, line 24, for "surface-reactive" read -- surface-active --.

Signed and sealed this 13th day of June 1961.

(SEAL)
Attest:

ERNEST W. SWIDER                                DAVID L. LADD

Attesting Officer                                       Commissioner of Patents